(12) United States Patent
French et al.

(10) Patent No.: US 7,631,054 B2
(45) Date of Patent: Dec. 8, 2009

(54) METHOD AND SYSTEM FOR GENERATING LIST OF OPERATING SYSTEMS FOR A TARGET DEVICE

(75) Inventors: Steven M. French, Austin, TX (US); Lorin E. Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2191 days.

(21) Appl. No.: 09/731,624

(22) Filed: Dec. 7, 2000

(65) Prior Publication Data

US 2002/0073186 A1 Jun. 13, 2002

(51) Int. Cl.
*G00F 15/177* (2006.01)
(52) U.S. Cl. .................. 709/220; 709/223; 709/245; 717/175; 717/167; 713/2
(58) Field of Classification Search .................. 709/223, 709/220, 245; 717/175, 167; 713/2
See application file for complete search history.

(56) References Cited

U.S. PATENT DOCUMENTS

| | | | |
|---|---|---|---|
| 5,361,358 A | 11/1994 | Cox et al. | |
| 5,367,686 A | 11/1994 | Fisher et al. | |
| 5,737,610 A * | 4/1998 | Sandig et al. | 717/167 |
| 5,764,984 A * | 6/1998 | Loucks | 719/319 |
| 5,802,365 A * | 9/1998 | Kathail et al. | 719/321 |
| 5,828,888 A | 10/1998 | Kozaki et al. | |
| 5,905,872 A * | 5/1999 | DeSimone et al. | 709/245 |
| 6,066,182 A * | 5/2000 | Wilde et al. | 717/175 |
| 6,115,741 A * | 9/2000 | Domenikos et al. | 709/217 |
| 6,182,275 B1 * | 1/2001 | Beelitz et al. | 717/175 |
| 6,219,742 B1 * | 4/2001 | Stanley | 710/260 |
| 6,457,122 B1 * | 9/2002 | Ramezani | 713/1 |
| 6,477,642 B1 * | 11/2002 | Lupo | 713/2 |
| 6,564,252 B1 * | 5/2003 | Hickman et al. | 709/214 |
| 6,584,499 B1 * | 6/2003 | Jantz et al. | 709/220 |
| 6,658,486 B2 * | 12/2003 | Buzbee et al. | 719/318 |
| 6,662,198 B2 * | 12/2003 | Satyanarayanan et al. | 707/204 |

* cited by examiner

*Primary Examiner*—Thanh Tammy Nguyen
(74) *Attorney, Agent, or Firm*—Yee & Associates, P.C.; Jeffrey S. LaBaw

(57) ABSTRACT

A method of dynamically creating a list of operating systems for a target device in communication with a server prior to executing an operating system on the target device is provided. The target device receives an available operating systems list from the server. A hardware configuration of the target device is then determined. It is also determined if the hardware configuration is compatible with each operating system from the available operating systems list. A list of compatible operating systems is then generated. Systems and programs for dynamically creating a list of operating systems for a target device are also provided.

27 Claims, 4 Drawing Sheets

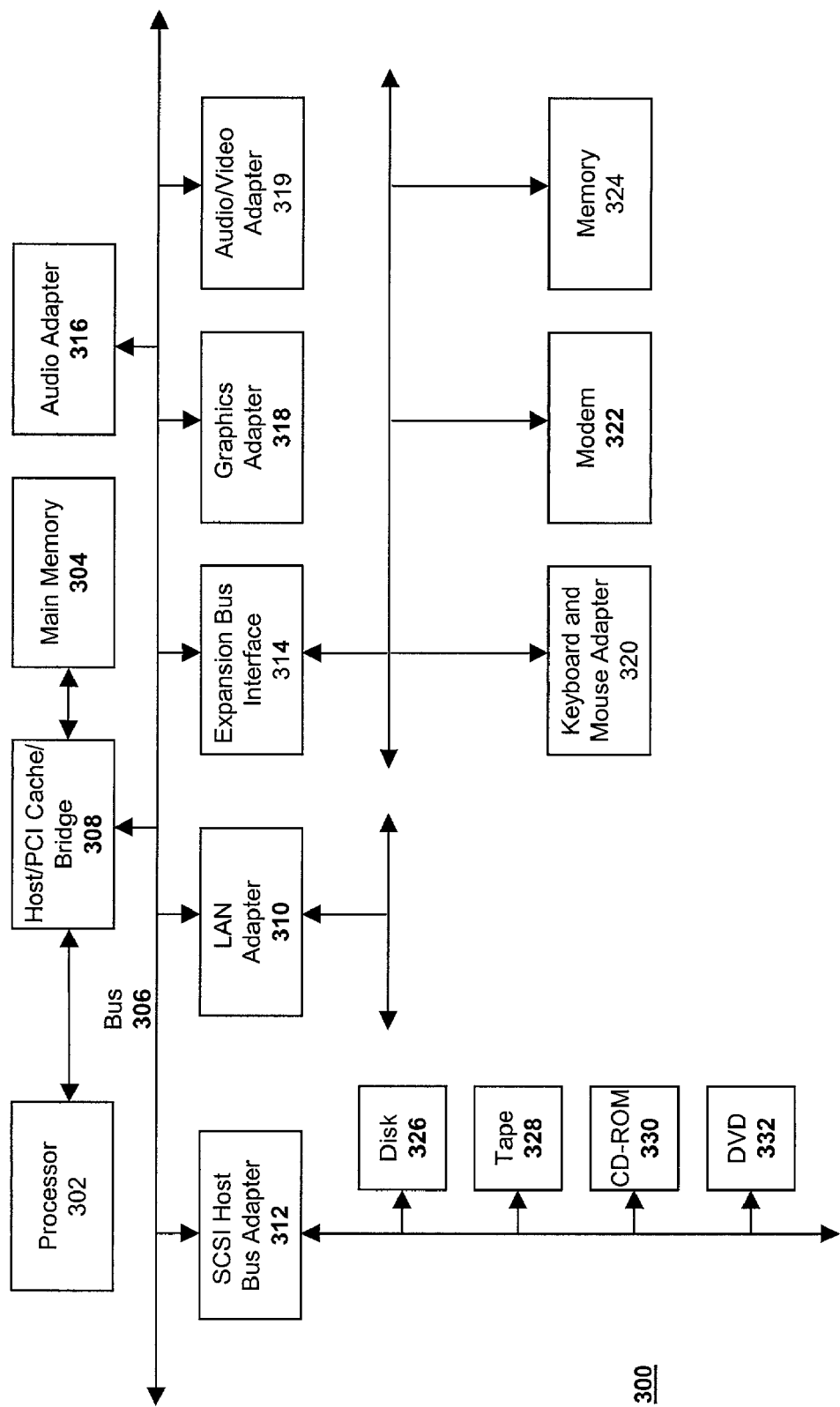

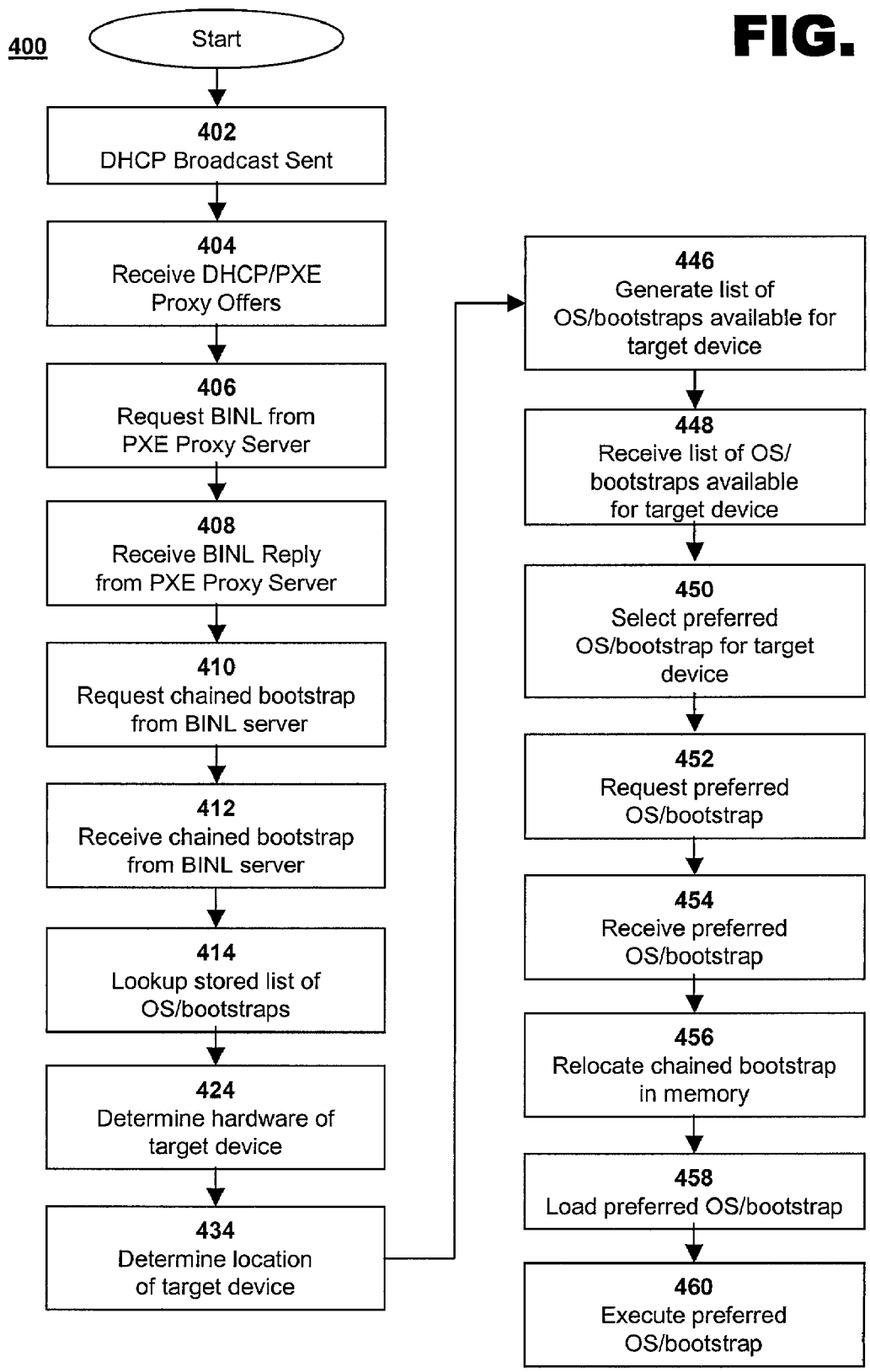

METHOD AND SYSTEM FOR GENERATING LIST OF OPERATING SYSTEMS FOR A TARGET DEVICE

BACKGROUND OF THE INVENTION

1. Field of the Invention

The present invention relates to client computers that are bootable over a network and, in particular, client computers that may be serviced by multiple boot servers. More specifically, the present invention relates to a method for generating a list of operating systems to be made available to a target device that is remotely booted.

2. Description of the Related Art

Some current computing devices include support for preboot extensions to download an operating system (OS) from a network to which they are attached. Such target computing devices include computer motherboards, network adapters and boot diskettes. These devices rely on extensions to the bootstrap protocol (BOOTP) and to the dynamic host configuration protocol (DHCP). Such extensions are often termed the preboot execution environment (PXE) and require a DHCP/PXE server and a boot image negotiation layer (BINL) server.

BOOTP is a transmission control protocol/Internet protocol (TCP/IP) used by a diskless workstation, network computer (NC) or other target device to obtain its IP address and other network information, such as server address and default gateway. Upon startup, the target device sends out a BOOTP request to the BOOTP server, which returns the required information. The BOOTP request and response use an IP broadcast function, which is able to send messages before a specific IP address for a target device is known.

DHCP is software that automatically assigns an IP address to a target device logging onto a TCP/IP network. DHCP eliminates the need for manually assigning permanent IP addresses.

PXE enables a client network computer or other target device that lacks a native operating system to locate and acquire a small network bootstrap program (NBP) from a BINL server. The target device may acquire this NBP from a BINL server through a network attachment. PXE also provides a means for running the NPB on the target device. This allows the target device to continue acquiring additional software from the network that may be required to make the target device capable of performing the more complex and useful tasks assigned to it by an enterprise.

PXE relies on extensions of DHCP as the means by which the target device locates a BINL server from which to acquire an NPB. A facilitating property of DHCP is that the target device does not need the address of any other computer. The target device performs a DHCP broadcast to discover any PXE proxy server that can recognize that the target device is PXE-capable. The DHCP proxy server sends a DHCP offer to the target device. The offer contains the address of the BINL server from which the target device may obtain a NBP. The target device then obtains the NBP and all necessary software from the boot server via a trivial file transfer protocol (TFTP).

Current approaches to selecting the operating system to boot on a target device depend on the BINL server, which is delivered by multiple vendors, such as Intel™, IBM™ and Microsoft™. Each platform has different implementations and behaviors. Once the operating system is booted on a target device, a user can login and use the current operating system.

However, there is no way for the user to determine if other operating systems are available for the device or what other operating systems may be used with the device. Additionally, the list of available operating systems for a target device is currently a static list accessed via TFTP configuration files or via a boot sector on the hard disk. There is no way to generate a list of available operating systems that considers such factors as the operating systems available from a server connected to the target device, the operating systems preferred by the server or network to which the target device is connected, other operating systems compatible with the hardware of the target device or operating systems available for a target device in a given location.

It would be desirable therefore to provide a method of selecting an operating system that overcomes the above.

SUMMARY OF THE INVENTION

One aspect of the present invention provides a method of dynamically creating a list of operating systems for a target device in communication with a server prior to executing an operating system on the target device. An available operating systems list is received from the server, at the target device. A hardware configuration of the target device is determined and it is determined if the hardware configuration is compatible with each operating system from the available operating systems list. A compatible operating systems list is then generated. The hardware configuration may be determined by a network discovery process.

A specific location of the target device may also be mapped and at least one location-based operating system may be determined based on the specific location. It may also be determined if the hardware configuration is compatible with the location-based operating system. If the compatible operating systems list does not include the location-based operating system and the location-based operating system is compatible with the hardware configuration, the location-based operating system may be added to the compatible operating systems list. The location-based operating system may also be added to the available operating systems list if the available operating systems list does not include the location-based operating system. A target operating system may be selected from the compatible operating system list and received at the target device.

An initial network bootstrap program may also be provided to and executed on the target device before the target operating system is selected. The network bootstrap program may be relocated after the target operating system is received.

Another aspect of the present invention provides computer program product in a computer usable medium for dynamically creating a list of operating systems for a target device in communication with a server. This program may include means for receiving an available operating systems list of at least one operating system available to the target device. The program may also include means for determining a hardware configuration of the target device and if the hardware configuration is compatible with each operating system from the available operating systems list. The program may also include means for generating a compatible operating systems list. The program may also include means for discovering the hardware configuration via a network discovery process.

The program may also include means for determining at least one location-based operating system based on the location of the target device. The program may also include means for adding the location-based operating system to the available operating systems list or to the compatible operating systems list. The program may also include means for determining if the location-based operating system is compatible with the hardware configuration.

The program may also include means for receiving a selection of a target operating system from the compatible operating system list and for sending the target operating system to the target device. The program may also include means for executing an initial network bootstrap program on the target device before the target operating system is selected. The program may also include means for relocating the network bootstrap program after the target operating system is selected.

Another aspect of the invention provides a network data processing system including means for sending an available operating systems list from a server to a target device prior to executing an operating system on the target device. The system may also include means for determining a hardware configuration of the target device and means for determining if the hardware configuration is compatible with each operating system from the available operating systems list. The system may also include means for generating a compatible operating systems list.

The system may also include means for determining a specific location of the target device, means for determining at least one location-based operating system that is based on the specific location and means for determining if the location-based operating system is compatible with the hardware configuration.

The system may also include means for executing an initial bootstrap on the target device before a target operating system is selected, means for selecting the target operating system from the compatible operating systems list, means for relocating the initial bootstrap after the target operating system is selected and means for sending the target operating system to the target device.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

BRIEF DESCRIPTION OF THE DRAWINGS

FIG. 3 is a block diagram of another embodiment of a data processing system in accordance with the present invention; and FIG. 4 is a flow diagram of one embodiment of a method of selecting an operating system in accordance with the present invention.

DETAILED DESCRIPTION

Figure 1:
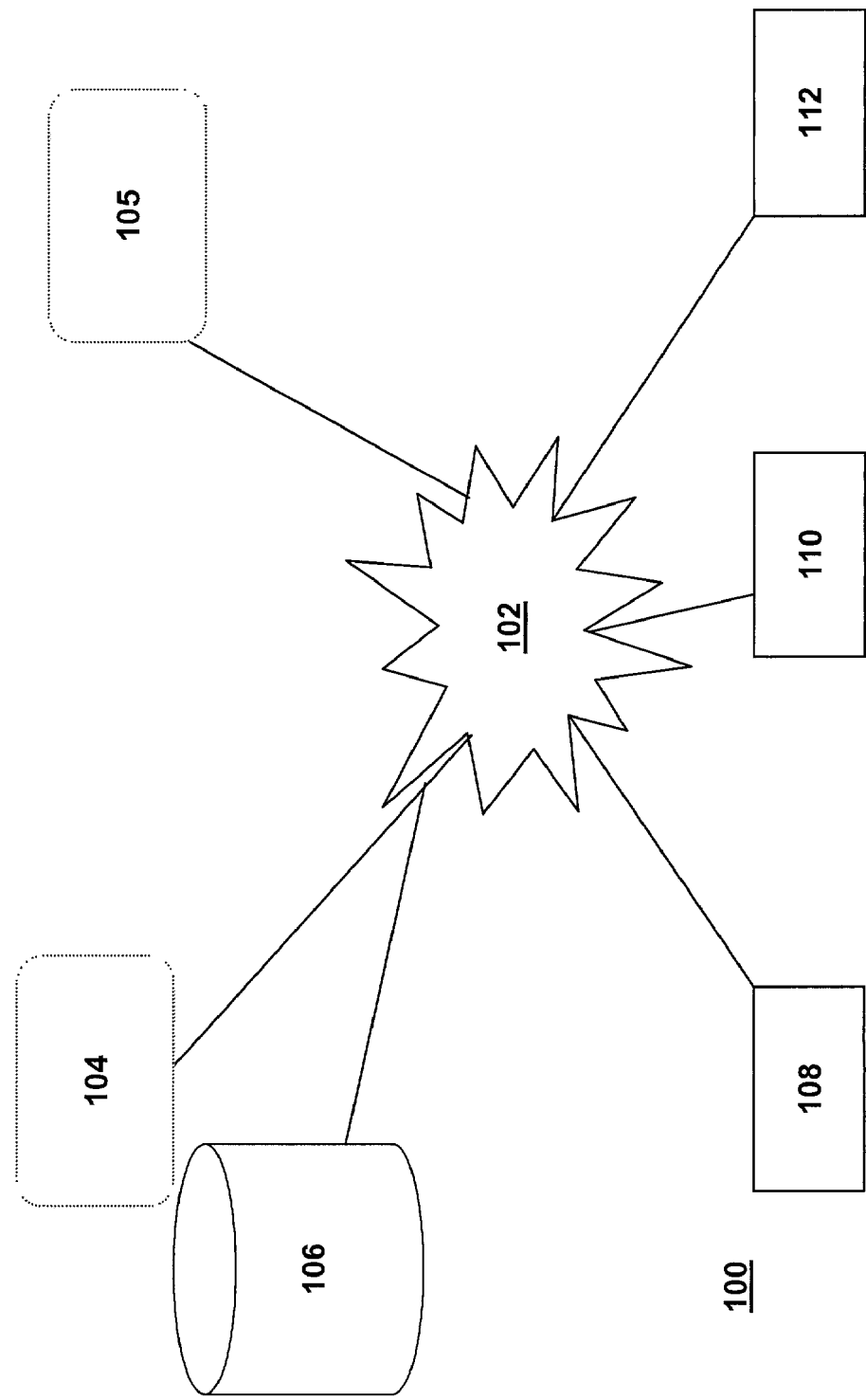
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices, such as computers, connected to or in communication with each other within network data processing system 100. For example, network 102 may include connections, such as wire connections, wireless communication links or fiber optic cables.

In the embodiment of FIG. 1, a server 104 may be in communication with network 102. Server 104 may provide data, such as boot files, operating system images and applications to network 102 and/or to other components in communication with network 102 as described below. System 100 may also include another server 105 which may be identical to or different from server 104. Server 105 may also provide data, such as boot files, operating system images and applications to network 102 and/or to other components in communication with network 102 as described below. System 100 may also include additional servers (not shown).

One or more storage units, such as storage unit 106 may also be in communication with server 104, 105 and/or network 102. Storage unit 106 may store data, such as boot files, operating system images and applications that may be processed or conveyed by server 104. Storage unit 106 may also store data to be made available to or processed by network 102 and/or to other components in communication with network 102 as described below.

In addition, target devices 108, 110 and 112 are also in communication with network 102. These target devices may be, for example, personal computers or network computers. Target devices 108, 110, 112 may serve as clients to server 104. Network data processing system 100 may include additional servers, clients and other devices not shown.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

One embodiment of the present invention provides a network environment, which may include a DHCP/PXE proxy server. For example, server 104 may be a DHCP/PXE proxy server. Alternatively, server 105 may be a DHCP/PXE proxy server. System 100 may also include one or more boot servers. For example server 104 or server 105 may serve as a boot server. These boot servers may be collated on servers 104, 105 with the DHCP/PXE proxy servers. In one embodiment of the invention, one or more target devices, such as devices 108, 110, 112, may include pre-boot extensions that allow the devices to download OS information from a boot server.

Figure 2:
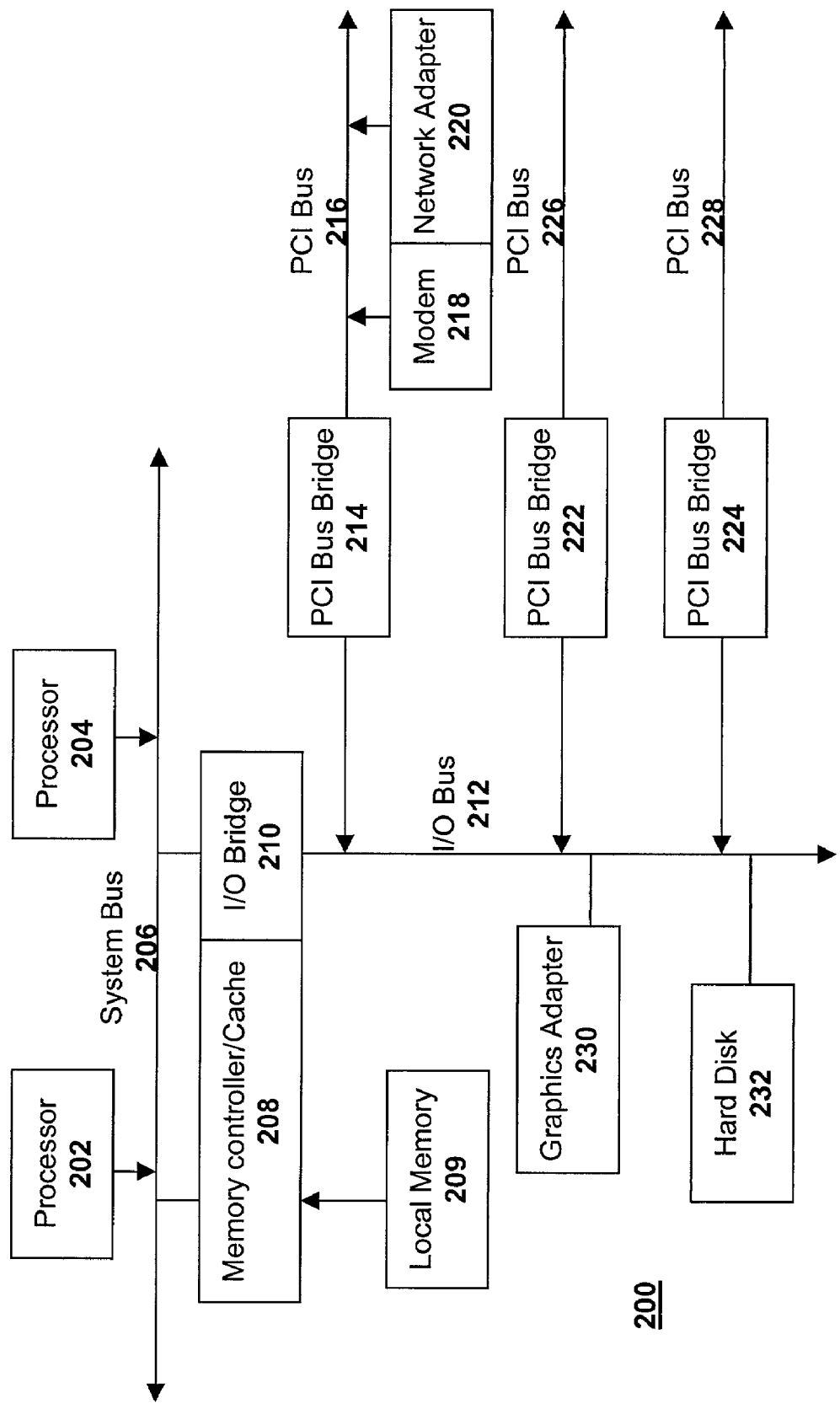
FIG. 2 is a block diagram of one embodiment of a data processing system in accordance with the present invention.

FIG. 2 is a block diagram of a data processing system in accordance with the present invention at 200. In one embodiment of the invention, data processing system 200 may be implemented as one or more of the servers 104, 105 shown in FIG. 1.

Data processing system 200 may be a symmetric multiprocessors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate components.

Peripheral component interconnect (PCI) bus bridge 214 connected to I/O bus 212 may provide an interface to PCI local bus 216. One or more modems may be connected to PCI bus 216. Typical PCI bus implementations support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG. 1.

Additional PCI bus bridges 222 and 224 may provide interfaces for additional PCI buses 226 and 228. Additional modems or network adapters may be supported from PCI buses 226 and 228. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

One embodiment of data processing system 200 may be an IBM RISC/System 6000 system, a product of International Business Machines Corporation in Armonk, N.Y., running the Advanced Interactive Executive (AIX) operating system.

FIG. 3 is a block diagram of a data processing system in accordance with the present invention at 300. Data processing system 300 may be, for example, one or more of the target devices 108, 110, 112 depicted in FIG. 1 and described above. In one embodiment of the invention, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots.

Expansion bus interface 314 may provide a connection for additional components such as, for example, a keyboard and mouse adapter 320, a modem 322 and additional memory 324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations support three or four PCI expansion slots or add-in connectors.

In one embodiment of the invention, an operating system (OS) may run on processor 302. This OS may be used to coordinate and provide control of various components within data processing system 300. The OS may be a commercially available operating system. For example, the OS may be Linux™, OS/2 Warp 4™ or Windows 2000™. An object oriented programming system may be in communication with the OS and may run in conjunction with the OS. For example, the object-oriented programming system may provide calls to the OS from programs or applications executing on data processing system 300. These programs or applications may be specific to the object-oriented programming system or may be programs or applications run by other programming systems. In one embodiment of the invention, the object-oriented programming system may be Java™, a trademark of Sun Microsystems, Inc.

Instructions for the OS, the object-oriented operating system, and applications or programs may be located on storage devices such as, for example, hard disk drive 326. These operating systems, applications and/or programs may be loaded into main memory 304 for execution by processor 302.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide nonvolatile memory for storing operating system files and/or user-generated data.

FIG. 4 is one embodiment of a method for selecting an operating system in accordance with the present invention at 400. The operating system selected using this method may be an OS on a target device such as devices 108, 110, 112 depicted in FIG. 1 and described above. A user of a target device may login to the device before or after the process shown at 400 is completed.

At block 402, the target device may send a DHCP broadcast. For example, the target device may be connected to a network and send the DHCP broadcast to the network and servers, such as BINL servers, in communication with the network.

At block 404, the target device may receive DHCP/PXE proxy offers. These proxy offers indicate which other components in communication with the target device are able to process a BINL request.

At block 406, the target device may send a BINL request to a PXE proxy server. In one embodiment of the invention, this PXE proxy server is one of the proxy offers received at block 404.

At block 408, the target device may receive a BINL reply from the PXE proxy service. In one embodiment of the invention, this reply indicates the IP address of a BINL server.

At block 410, the target device may send a TFTP request to the BINL server indicated at block 408. In one embodiment of the invention, the request is for an initial NPB file. At block 412, the reply may be received from the BINL server. For example, the server may provide an initial NBP file to the target device.

In one embodiment of the invention, the NBP file is a chained bootstrap. This chained bootstrap may be specified once as the default bootstrap. This chained bootstrap may be the first bootstrap loaded on the target device. This chained bootstrap "chains" itself, e.g., interposes itself in front of, the actual OS/bootstrap to be used on the target machine. In one embodiment of the invention, a reference to this chained bootstrap is the only entry in the BINL server. Alternatively, a reference to this chained bootstrap may be the default reply of the BINL server. Thus, the BINL configuration may not change regardless of the OS/bootstrap eventually used on a given target device. The BINL configuration also may not change when a new OS is added into the system.

At block 414, a list of OS/bootstraps for the target device may be located. For example, the name or identification of the target device and OS/bootstraps available to the device may be stored in any suitable location within the system 200, 300. In one embodiment, the identification of the target device and its associated OS is stored in a central machine inventory database. Alternatively, the identification of the target device and its associated OS may be in a configuration file. The configuration file may provide any useful data regarding target device, including information on how target device is currently configured or information about how target device should be configured. In one embodiment of the invention, the configuration file is located on server 104, 105. Alternatively, the configuration file may be written into a directory specific to the target device. The configuration file may be managed by a separate system, making it independent of the implementation of BINL servers from different vendors.

If no list is found at block 414, the process may continue to block 424. Alternatively, a list may be found at block 414 but additional OS/bootstraps may be added to the list at block 416. At block 424, the hardware of the device may be determined. For example, the target device's configuration file may provide information about the target device's hardware. Operating systems that are incompatible with this hardware may be disabled and therefore not incorporated into the list of OS/bootstraps available for the target device. Alternatively, a list of OS/bootstraps that are compatible with the hardware may be added to the list found at block 414. Additionally, the information about target device determined at block 424 may be used to remove one or more of the OS/bootstraps found at block 414.

Several methods may be used to determine a list of OS/bootstraps that are compatible with given hardware. In one method, the target device or the server may run a manufacturer-provided utility to determine compatibility. In one embodiment of the invention, the utility is provided by the manufacturer of the operating system. For example, in Windows 2000™ the install utility can be invoked with a parameter to determine compatibility (e.g., WINNT32/CHECKUPGRADEONLY).

In another method, a BIOS scan may be run at the target device. Such a scan may return the list of unique ID numbers for each hardware component of a target device. For example, the scan may return the list of ID numbers of Plug-and-Play components of the target device. These device IDs may then be mapped into a table of devices that are known to be incompatible or compatible with a given operating system. The compatibility or incompatibility of the target device may then be determined based on such a table.

In a third method, the target device's serial number or model number may be determined and used as an index into an inventory database. The inventory database may include compatible operating systems for a given model number (e.g. compatible OS for a Compaq™ 486) machine serial number (e.g. HP serial no. XXX-XXXX) or general class of machine (e.g. compatible OS for all Dell™).

At block 434, additional modification of the list of OS/bootstraps may occur. At block 434, the actual location of the target device may be determined. This may be done by matching route/geographic information, e.g., matching an Medium Access Control (MAC) address to a physical location database. Information about the physical location of the target device may add to or eliminate OS/bootstraps that may be available to the device. As one example, all target devices in building 904 are required to boot Linux distribution configured for Kiosk mode. Thus, if, at block 424, the target device is determined to be in building 904 at block 424, then the only OS/bootstrap available to the device is Linux distribution configured for Kiosk mode.

At block 446, a list of OS choices may be generated based on the information gathered at blocks 414, 424 and 434. In alternate embodiments of the invention, the list of OS choices may be generated using information from only one of blocks 414, 424 and 434 or from any given combination of blocks 414, 424 and 434, in any given sequence. Thus, for example, at block 446, a list may be generated that includes the OS/bootstraps listed at block 414 and any additional OS/bootstraps that match the hardware determination made at block 424 and the location determination made at block 434. Alternatively, information from block 424 and/or block 434 may be used to eliminate items from the list found at block 414. Alternatively, information from block 424 and/or block 434 may be used to generate a list at block 446 if no list is found at block 414.

At block 448, the list of OS/bootstraps generated at block 446 may be received. For example, the list may be received by the target device.

At block 450, the preferred bootstrap for the target device may be selected from the list received at block 448. This selection may be automatic. Alternatively, a system administrator or other such entity may select the preferred bootstrap. Alternatively, the user may be provided with the list of available OS/bootstraps and may then select the preferred bootstrap. For example, the user may select a preferred bootstrap from a graphic user interface that shows the list of available OS/bootstraps.

At block 452, the preferred OS/bootstrap may be requested. In one embodiment of the invention, the request takes the form of a TFTP request to the BINL server. At block 454, the preferred OS/bootstrap may be received. For example, the OS and its associated bootstrap may be downloaded to the target device. At block 456, the chained bootstrap then relocates itself so that it does not interfere with the preferred OS/bootstrap. In one embodiment, the chained bootstrap relocates itself in the memory of the target device. At block 458, the preferred OS/bootstrap are loaded and executed (at block 460) on the target device.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal-bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms such as, for example, radio frequency and light wave transmissions. The computer readable media may take the form of coded formats that are decoded for actual use in a particular data processing system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A method of dynamically creating a list of operating systems for a target device in communication with a server, the target device to be remotely booted by the server, prior to executing an operating system on the target device, comprising:
   receiving from the server, at the target device, an available operating systems list of at least one operating system available to the target device;
   determining a hardware configuration of the target device;
   determining if the hardware configuration is compatible with each operating system from the available operating systems list; and
   generating a compatible operating systems list.

2. The method of claim 1 wherein the hardware configuration is determined by a network discovery process.

3. The method of claim 1, further comprising:
   mapping a specific location of the target device.

4. The method of claim 3 further comprising:
   determining at least one location-based operating system that is based on the specific location of the target device.

5. The method of claim 4 further comprising:
   determining if the hardware configuration is compatible with the location-based operating system.

6. The method of claim 4 wherein the compatible operating systems list does not include the location-based operating system, further comprising:
   adding the location-based operating system to the compatible operating systems list.

7. The method of claim 4, wherein the available operating systems list does not include the location-based operating system, further comprising:
   adding the location-based operating system to the available operating systems list.

8. The method of claim 1, further comprising:
   selecting, at the target device, a target operating system from the compatible operating system list.

9. The method of claim 8 further comprising:
   receiving at the target device, the target operating system.

10. The method of claim 9 further comprising:
    providing an initial bootstrap to the target device; and
    executing the initial bootstrap on the target device before the target operating system is selected.

11. The method of claim 10 further comprising:
    relocating the initial bootstrap after the target operating system is received.

12. Computer program product in a computer usable medium for dynamically creating a list of operating systems for a target device in communication with a server, the target device to be remotely booted by the server, comprising:
    means for receiving at the target device an available operating systems list of at least one operating system available to the target device;
    means for determining a hardware configuration of the target device;
    means for determining if the hardware configuration is compatible with each operating system from the available operating systems list; and
    means for generating a compatible operating systems list.

13. The program of claim 12 further comprising
    means for discovering the hardware configuration via a network discovery process.

14. The program of claim 12 further comprising:
    means for determining at least one location-based operating system based on the location of the target device.

15. The program of claim 14 further comprising:
    means for adding the location-based operating system to the available operating systems list.

16. The program of claim 14 further comprising:
    means for determining if the hardware configuration is compatible with the location-based operating system.

17. The program of claim 16 further comprising:
    means for adding the location-based operating system to the compatible operating systems list if the hardware configuration is compatible with the location-based operating system.

18. The program of claim 12, further comprising:
    means for receiving a selection of a target operating system from the compatible operating system list; and
    means for sending the target operating system to the target device.

19. The program of claim 18 further comprising:
    means for executing a network bootstrap on the target device before the target operating system is selected.

20. The method of claim 19 further comprising:
    means for relocating the network bootstrap after the target operating system is selected.

21. A network data processing system comprising:
    means for sending an available operating systems list torn a server to a target device, the target device to be remotely booted by the server, prior to executing am operating system on the target device;
    means for determining a hardware configuration of the target device;
    means for determining if the hardware configuration is compatible with each operating system from the available operating systems list; and
    means for generating a compatible operating systems list.

22. The system of claim 21 further comprising:
    means for determining a specific location of the target device;
    means for determining at least one location-based operating system that is based on the specific location; and
    means for determining if the location-based operating system is compatible with the hardware configuration.

23. The system of claim 21 further comprising:
    means for executing a network bootstrap program on the target device before a target operating system is selected;
    means for selecting the target operating system from the compatible operating systems list;
    means for relocating the network bootstrap program after the target operating system is selected; and
    means for sending the target operating system to the target device.

24. A method of dynamically creating a list of operating systems for a target device in communication with a server, the target device to be remotely booted by the server, prior to executing an operating system on the target device, comprising:

receiving from the server, at the target device, an available operating systems list of at least one operating system available to the target device;

determining a hardware configuration of the target device;

determining if the hardware configuration is compatible with each operating system from the available operating systems list; and generating a compatible operating systems list;

selecting a preferred operating system for the target device from the compatible operating systems list; and executing the preferred operating system on the target device.

25. The method of claim 24 wherein selecting a preferred operating system for the target device comprises an automatic selection.

26. The method of claim 24 wherein selecting a preferred operating system for the target device comprises a selection by a system administrator.

27. The method of claim 24 wherein selecting a preferred operating system for the target device comprises a selection by a user.

* * * * *

UNITED STATES PATENT AND TRADEMARK OFFICE
CERTIFICATE OF CORRECTION

PATENT NO. : 7,631,054 B2   Page 1 of 1
APPLICATION NO. : 09/731624
DATED : December 8, 2009
INVENTOR(S) : French et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2355 days.

Signed and Sealed this

Second Day of November, 2010

David J. Kappos
*Director of the United States Patent and Trademark Office*